Figure 1:
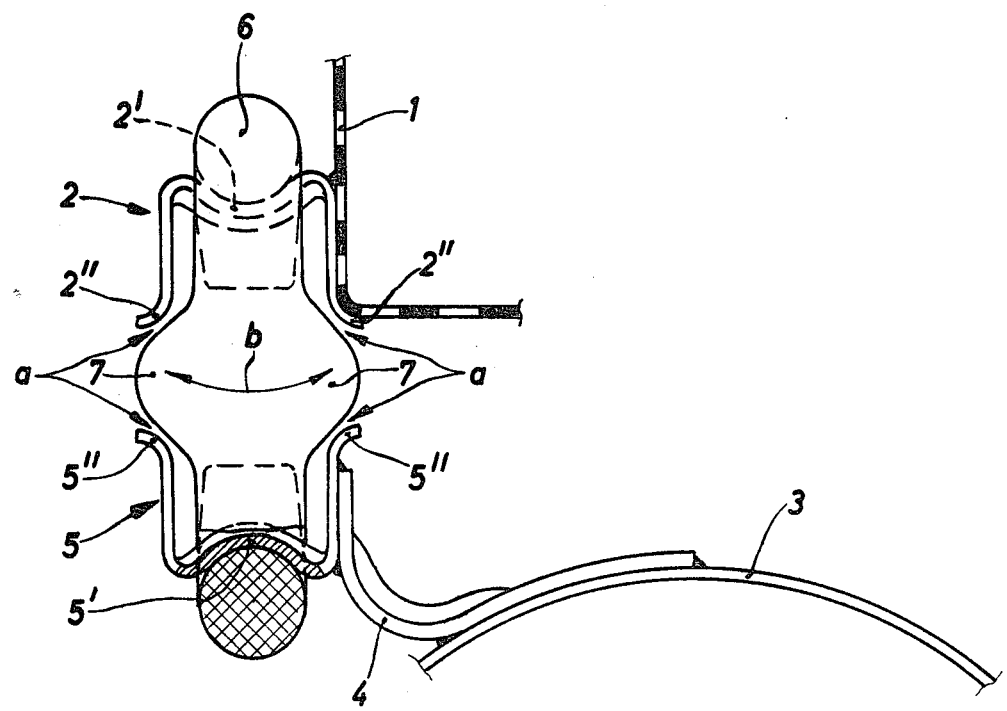

United States Patent [19]

Heiland et al.

[11] 4,086,977

[45] May 2, 1978

[54] SUSPENSION INSTALLATION FOR AN EXHAUST GAS SYSTEM

[75] Inventors: Hans Heiland, Munich; Otto Seyfferle, Oberschleissheim, both of Germany

[73] Assignee: Bayerische Motoren Werke Aktiengesellschaft, Germany

[21] Appl. No.: 725,342

[22] Filed: Sep. 21, 1976

[30] Foreign Application Priority Data

Sep. 23, 1975 Germany .............................. 2542272

[51] Int. Cl.² .............................................. B60K 13/04
[52] U.S. Cl. .................................. 180/64 A; 248/54 R
[58] Field of Search ............. 180/64 A; 248/50, 54 R, 248/62, 74 R

[56] References Cited

U.S. PATENT DOCUMENTS

| 3,161,252 | 12/1964 | Brown | 180/64 A |
|---|---|---|---|
| 3,204,901 | 9/1965 | Dunn | 180/64 A |
| 3,313,503 | 4/1967 | Mayr | 180/64 A |
| 3,977,486 | 8/1976 | Kleinschmit | 180/64 A |

FOREIGN PATENT DOCUMENTS

| 870,366 | 7/1949 | Germany | 180/64 A |
|---|---|---|---|
| 1,505,498 | 9/1969 | Germany | 180/64 A |
| 16,847 | 6/1970 | Japan | 248/54 R |

Primary Examiner—David M. Mitchell
Attorney, Agent, or Firm—Craig & Antonelli

[57] ABSTRACT

A suspension installation for an exhaust gas system of a motor vehicle, especially of a passenger motor vehicle, which essentially consists of a support part rigidly mounted at the vehicle body and of a support part rigidly mounted at the exhaust gas system and of a support ring of elastic material operatively connecting these support parts; the cross section of the support ring has at least one cross-sectional change and each support part is provided with abutments which are so arranged that they cooperate with this cross-sectional change.

16 Claims, 2 Drawing Figures

SUSPENSION INSTALLATION FOR AN EXHAUST GAS SYSTEM

The present invention relates to a suspension installation for an exhaust gas system in a motor vehicle, especially in a passenger motor vehicle, essentially consisting of two support parts each rigidly mounted respectively at the vehicle body and at the exhaust gas system and of a support ring of elastic material connecting the support parts.

With this suspension installation as disclosed in the German published patent application, Offenlegungsschrift No. 1,505,498, published Sept. 18, 1969, the support ring stressed in tension so cooperates with the support parts that the muffler is able to swing freely laterally during the operation of the motor vehicle and especially when the motor vehicle drives over road-unevennesses or the like. This entails the disadvantage that when constricted space conditions or constructive reasons require to arrange the muffler within the area of a body part, the muffler is able to come into contact with the body part, from which result annoying rattle noises.

A suspension installation is also known in the art (German Pat. No. 870,366) in which the exhaust gas system is suspended at the vehicle body by means of laterally outwardly directed support rings prestressed in tension. This suspension installation, however, entails the disadvantage that as a result of the mutual tensional stressing of the support rings, the entire suspension system becomes acoustically hard, i.e., vibrations are thereby able to continue from the muffler to the vehicle body.

In contradistinction thereto, it is the aim of the present invention to provide a suspension installation which is simple in its construction and which does not entail the disadvantages of the prior art suspension installations.

The underlying problems are solved according to the present invention in that the cross section of the support ring has at least one cross-sectional change and each support member is provided with abutments which are so arranged that they cooperate with the cross-sectional change of the support ring.

The advantage of the present invention resides especially in that exclusively by a slight constructive change of a known support ring which cooperates with two structural parts of simple construction, an acoustically soft suspension installation preventing the lateral swinging of the muffler is created, which altogether can be manufactured in a cost-favorable manner and is constructed space-saving. Therebeyond, the suspension installation according to the present invention can be easily installed and removed and can be installed in place of existing muffler suspensions with only slight expenditures.

In one embodiment of the present invention, provision is made that the cross-sectional change is constructed as a cam-shaped extension or projection which is preferably arranged within the area of the two end faces of the support ring.

Accordingly, it is an object of the present invention to provide a suspension installation for an exhaust gas system of a motor vehicle which avoids by simple means the aforementioned shortcomings and drawbacks encountered in the prior art.

Another object of the present invention resides in a suspension installation for an exhaust gas system in a motor vehicle, which effectively prevents annoying rattle noises due to contact between the exhaust gas system and the body.

A further object of the present invention resides in a suspension installation which is simple in construction and requires merely a slight constructive change in the hitherto known support rings.

Another object of the present invention resides in a suspension installation of the type described above which can be manufactured in a relatively cost-saving manner and which is constructed in a space-saving manner.

A still further object of the present invention resides in a suspension installation for exhaust gas systems of passenger motor vehicles which can be readily installed and removed and serviced by ready replacement of worn parts by spare parts.

Figure 2:
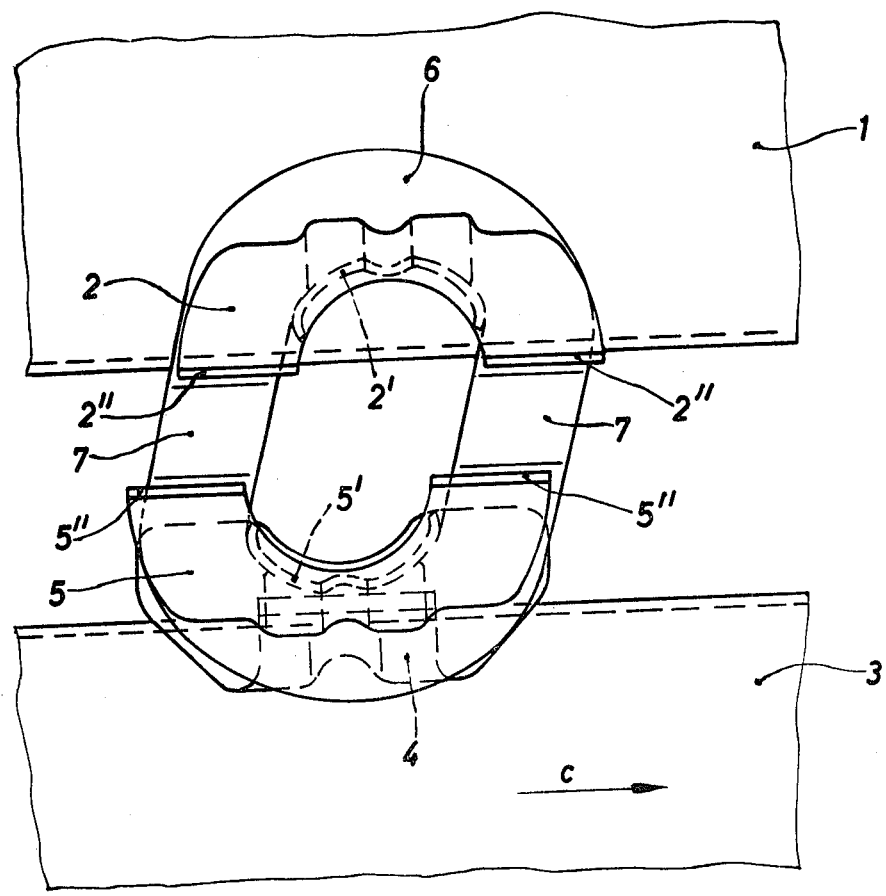

These and other objects, features and advantages of the present invention will become more apparent from the following description when taken in connection with the accompanying drawing which shows, for purposes of illustration only, one embodiment in accordance with the present invention, and wherein:

FIG. 1 is a front elevational view of a suspension installation of a muffler of a motor vehicle in accordance with the present invention; and FIG. 2 is a side elevational view of the suspension installation according to the present invention.

Referring now to the drawing wherein like reference numerals are used throughout the two views to designate like parts, FIG. 1 illustrates a part 1 fixed at the vehicle body, at which is rigidly mounted a support member generally designated by reference numeral 2. A support member generally designated by reference numeral 5 is also rigidly connected by way of an intermediate member 4 at a muffler 3 disposed below the fixed vehicle part 1. The support member 2 on the side of the vehicle body and the support member 5 on the side of the muffler are suspendingly connected by way of a support ring 6 of elastic material. The support ring 6 has a circular cross-sectional profile and is equipped at its two end faces with two cam-shaped extensions 7 which are disposed in one plane. The support members 2 and 5 are each provided with abutments 2″ and 5″ disposed within the area of the cam-shaped extensions 7 which cooperate with the same during movements of the muffler 3.

The support members 2 and 5 each have a U-shaped cross section whereby the cross webs 2′ and 5′ thereof have respectively a concave cross section within the abutment area of the support ring 6 and extend arcuately shaped in side view. The distance between the two lateral legs of the support members 2 and 5 is respectively slightly larger than the thickness of the support ring 6. The lateral legs of the support parts 2 and 5 are each provided within the area of their free ends with outwardly pointing abutments 2″ and 5″.

The lateral legs of the support members 2 and 5 extend under the static load of the support ring 6 by the muffler 3, i.e., with a load of the support ring 6 acting in the vertical direction, so far into the area of the cam-shaped extensions 7 that a clearance space $a$ results between the outer surfaces thereof and the inner cheeks of the abutments 2″ and 5″. It is achieved thereby with the suspension installation of the present invention that, on the one hand, the muffler 3 can swing freely, in case of vibrations introduced into the same within the clearance spaces *a* in the sense of the double arrow *b* only so far until the cam-shaped extensions 7 elastically cooperate with the abutments 2" and 5" whereas, on the other hand, during thermal expansions of the muffler 3 together with the exhaust gas line connected therewith, the support ring 6 is able to longitudinally extend along in the horizontal direction within the scope of its elasticity.

The vibrations which occur during the operation of the motor vehicle and which extend in the vertical direction are absorbed by the suspension installation according to the present invention in such a manner that the abutments 5" at first come into abutment at the lower area of the cam-shaped extensions 7 which thereupon abut with their upper area at the abutments 2".

FIG. 2 illustrates the offset position of the support member 5 on the muffler side with respect to the support member 2 on the body side in the cold condition of the exhaust gas system. It is achieved by this measure that with a thermal expansion of the muffler 3 together with the exhaust gas line in the direction of arrow *c*, the support member 5 on the side of the muffler at first comes to lie underneath the support member 2 on the side of the vehicle body and finally can move slightly beyond the same. As a result thereof, the support ring 6 is lengthened only within the frame of its elasticity and under certain circumstances its destruction by an excessive lengthening is prevented which might result, for example, with a mutually oppositely disposed arrangement of the support members 2 and 5 in their normal, installed condition.

In the instant embodiment of the present invention, a support ring with convex cross-sectional changes has been preferred. However, these cross-sectional changes may also extend concavely within the scope of the present invention whereby the support parts are so constructed that they engage into constrictions of the support rings.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. Suspension installation for an exhaust device in a motor vehicle with a body, which comprises first support means substantially rigidly mounted at the vehicle body and second support means rigidly mounted at the exhaust device, and support ring means of elastic material operatively connecting said first and second support means in spaced relation, characterized in that the cross section of the support ring means in the area between the first and second support means has at least one cross section enlargement, and each support means is provided with abutment means which are so arranged that upon motion of the exhaust device crosswise to the plane of the support ring means they cooperate with the cross section enlargement of the support ring means to elastically limit the motion of the exhaust device crosswise to the plane of the support ring means.

2. A suspension installation according to claim 1, characterized in that the cross section enlargement is cam-shaped.

3. A suspension installation according to claim 1, characterized in that said support ring means is one support ring of elastic material.

4. A suspension installation according to claim 1, characterized in that the support ring means has an essentially circular cross-sectional profile and is provided within the area between the first and second support means with two cross section enlargements which are cam-shaped and on opposing sides of said support ring means.

5. A suspension installation according to claim 4, characterized in that the first support means and the second support means each have an approximately U-shaped cross section with lateral leg portions and a cross-web which has a concave cross section and which extends arcuately as viewed in side view, said support ring means abutting the cross-webs of the support means in the area having a concave cross section.

6. A suspension installation according to claim 5, characterized in that the spacing of the lateral leg portions of the support means is slightly larger than the thickness of the cross-sectional profile of the support ring means.

7. A suspension installation according to claim 6, characterized in that the lateral leg portions of the support means have free outwardly pointing ends for cooperating with the cross section enlargements of the support ring means, and wherein said abutment means include said outwardly pointing ends.

8. A suspension installation according to claim 7, characterized in that said abutment means have inner cheeks and in that, in a static condition, a clearance space is provided between each of the inner cheeks of the abutment means and the outer surface of the support ring means.

9. A suspension installation according to claim 8, characterized in that the second support means is arranged offset in the longitudinal direction of the exhaust device with respect to the first support means.

10. A suspension installation according to claim 1, characterized in that the first support means and the second support means each have an approximately U-shaped cross section with lateral leg portions and a cross-web wherein the spacing of the lateral leg portions of the support means is slightly larger than the thickness of the cross-sectional profile of the support ring means.

11. A suspension installation according to claim 1, characterized in that the support ring means is provided within the area between the first and second support means with two cross section enlargements which are on opposing sides of said support ring means and wherein the support means each have an approximately U-shaped cross section with lateral leg portions and a cross-web, said lateral leg portions having free ends wherein the lateral leg portions of the support means are provided within the area of their free ends with said abutment means which are respectively outwardly pointing for cooperating with the cross section enlargements of the support ring means.

12. A suspension installation according to claim 11, characterized in that said abutment means have inner cheeks and in that, in a static condition, a clearance space is provided between each of the inner cheeks of the abutment means and the outer surface of the respective, cooperating cross section enlargement of the support ring means.

13. A suspension installation according to claim 1, characterized in that the second support means is arranged offset in the longitudinal direction of the exhaust device with respect to the first support means.

14. A suspension installation according to claim 1, characterized in that the first support means and the second support means each have an approximately U-shaped cross section with a cross-web which has a concave cross section and which extends arcuately as viewed in side view, said support ring means abutting the cross-webs of the support means in the area having a concave cross section.

15. Suspension installation for an exhaust device in a motor vehicle with a body, which comprises first support means substantially rigidly mounted at the vehicle body and second support means rigidly mounted at the exhaust device, and support ring means of elastic material operatively connecting said first and second support means in spaced relation, characterized in that the cross section of the support ring means has at least one cross-sectional change in the area between the first and second support means, and each support means is provided with abutment means which are arranged so as to cooperate with said at least one cross-sectional change of the support ring means to elastically limit the motion of the exhaust device crosswise to the plane of the support ring.

16. A suspension installation according to claim 15, characterized in that the second support means is arranged offset in the longitudinal direction of the exhaust device with respect to the first support means.

* * * * *